(No Model.)

W. B. DUNNING.
HOSE COUPLING.

No. 309,444. Patented Dec. 16, 1884.

Attest:
Walter Donaldson
F. L. Middleton

Inventor
William B. Dunning
by Fee & Fee
Att'ys

UNITED STATES PATENT OFFICE.

WILLIAM B. DUNNING, OF GENEVA, NEW YORK.

HOSE-COUPLING.

SPECIFICATION forming part of Letters Patent No. 309,444, dated December 16, 1884.

Application filed March 27, 1884. (No model.)

*To all whom it may concern:*

Be it known that I, WILLIAM B. DUNNING, of Geneva, in the county of Ontario and State of New York, have invented a new and useful Improvement in Hose-Couplings; and I do hereby declare that the following is a full, clear, and exact description of the same.

My invention is an improved hose-coupling designed for the purpose of making a close and secure joint of inexpensive construction, and especially to secure facility in coupling and uncoupling.

It consists, essentially, in forming the ends of the coupling in halves adapted to overlap each other, and in uniting the halves by a sleeve.

Figure 1:
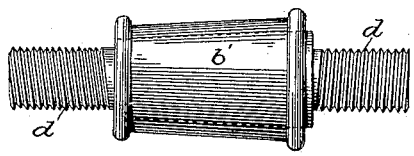
Figure 2:
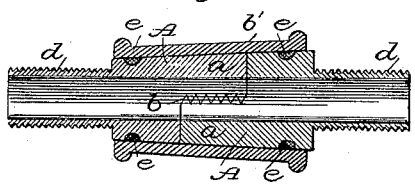
Figure 3:
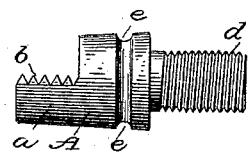
Figure 4:
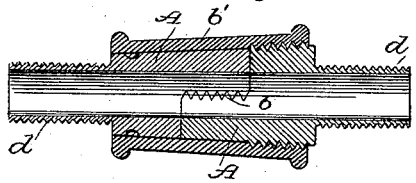

In the accompanying drawings, Figure 1 is a side elevation of the coupling. Fig. 2 shows a central longitudinal section of Fig. 1, and Fig. 3 represents one of the tubular parts of the coupling detached. Fig. 4 is a modification showing the sleeve screw-threaded.

The coupling is formed of three parts. The tubular parts A A are halved, as shown at *a a*, to overlap the facing, being preferably serrated, as shown at *b*, in order to prevent them from separating. Each part is provided with a threaded portion, *d*, for connection with the hose. The overlapping portions, when placed together, form a complete tube, the periphery of which is made, preferably, in a slight tapering form. Over this is fitted a sleeve, *b'*, with a tubular bore corresponding to the taper of the two halves. This sleeve may be seated by driving it on with a light blow, and may be unseated in the same manner, which operation may be very readily performed with any instrument adapted to give the blow.

In order to make the joint water-tight, I may provide the tubular part with peripheral grooves and rubber bands *e e*, over which the sleeve fits when driven on.

I do not confine myself to the serrated form of the faces of the two halves, as other forms may be used to hold the two parts together. Instead of the ends of the couplings and the interior of the sleeve being simply tapering, they may be screw-threaded to correspond to each other, and thus be screwed in place instead of driven. (See Fig. 4.)

I claim as my invention—

1. A coupling composed of two lapping parts having an outer surface wholly tapering, and the sleeve for uniting the parts tapering throughout its length and corresponding to the taper of the lapping parts, and means whereby the coupling is held against longitudinal disengagement, substantially as described.

2. The two halves A A, provided with the overlapping serrated parts *a a*, having a tapering surface, in combination with the sleeve having a corresponding internal taper, substantially as described.

In testimony whereof I have signed my name to this specification in the presence of two subscribing witnesses.

WM. B. DUNNING.

Witnesses:
S. SOUTHWORTH,
CHAS. H. RUSH.